United States Patent
Lepont et al.

(10) Patent No.: US 6,850,681 B2
(45) Date of Patent: Feb. 1, 2005

(54) RADIATION-CURABLE FLAME RETARDANT OPTICAL FIBER COATINGS

(75) Inventors: Claire Marie Lepont, Chicago, IL (US); Long Van Ha, Palatine, IL (US); Chau Thi Minh Ha, Chicago, IL (US)

(73) Assignee: Addison Clear Wave, LLC, Denver, CO (US)

( * ) Notice: Subject to any disclaimer, the term of this patent is extended or adjusted under 35 U.S.C. 154(b) by 235 days.

(21) Appl. No.: 10/225,953

(22) Filed: Aug. 22, 2002

(65) Prior Publication Data

US 2004/0037527 A1 Feb. 26, 2004

(51) Int. Cl.$^7$ ............... G02B 6/16; C08J 3/28; C08F 2/50
(52) U.S. Cl. ............ 385/128; 285/145; 285/123; 522/109; 522/111; 522/162; 522/170
(58) Field of Search ............... 385/126–128, 385/141–145; 522/162, 170, 109, 111

(56) References Cited

U.S. PATENT DOCUMENTS

| | | | |
|---|---|---|---|
| 3,980,390 A | | 9/1976 | Yamamoto et al. |
| 4,099,837 A | | 7/1978 | Vazirani |
| 4,469,724 A | * | 9/1984 | Klinger ............... 427/513 |
| 5,043,221 A | * | 8/1991 | Koleske ............... 428/413 |
| 5,240,971 A | * | 8/1993 | Eckberg et al. ........ 522/31 |
| 5,902,837 A | * | 5/1999 | Saito et al. ........... 522/31 |
| 5,913,004 A | | 6/1999 | Takase et al. |
| 6,136,880 A | | 10/2000 | Snowwhite et al. |
| 6,191,187 B1 | | 2/2001 | Yamamura et al. |
| 6,287,745 B1 | * | 9/2001 | Yamamura et al. ..... 430/269 |
| 6,306,924 B2 | | 10/2001 | Szum |
| 6,319,603 B1 | | 11/2001 | Komiya et al. |
| 6,362,249 B2 | | 3/2002 | Chawla |
| 6,711,335 B1 | * | 3/2004 | Shimizu et al. ........ 385/128 |
| 6,765,037 B2 | * | 7/2004 | Arnold ................. 522/88 |

OTHER PUBLICATIONS

European Search Report for related European Application No. EP 03 01 9072, dated Jan. 16, 2004.

T. Maruno and K. Nakamura, "Fluorine–Containing Optical Adhesives for Optical Communications Systems," 2296 Journal of Applied Polymer Science 42(1991) Apr. 20, No. 8, New York, US, pp. 2141–2148.

* cited by examiner

Primary Examiner—Edward J. Glick
Assistant Examiner—Krystyna Suchecki
(74) Attorney, Agent, or Firm—Marshall, Gerstein & Borun LLP

(57) ABSTRACT

A buffer coating for optical fibers is disclosed which includes a halogenated epoxy resin for flame-retardancy, and elastomer modified epoxy resin for tensile strength and flexibility, a low viscosity bisphenol resin for structural integrity, a viscosity modifier for improved process or extrusion properties, a polyol to increase the cure rate and cross-linking during curing, a slip agent or surfactant to reduce the adhesion of the buffer layer to the cladding and to further improve the flow characteristics during extrusion, and a photo-initiator. The buffer layer is flame-retardant and has a fast UV cure rate.

51 Claims, No Drawings

RADIATION-CURABLE FLAME RETARDANT OPTICAL FIBER COATINGS

TECHNICAL FIELD

Radiation-curable and flame-retardant optical fiber coatings are disclosed. More specifically, a buffer coating, which may replace primary and secondary coatings for an optical fiber, is disclosed which is both UV-curable and flame-retardant. Methods of manufacturing optical fibers with flame-retardant coatings and improved optical fibers with flame-retardant coatings are also disclosed.

BACKGROUND OF THE RELATED ART

There is a wide ranging demand for increased communication capabilities, including more channels and greater bandwidth per channel. The demand stems from the popularity of the Internet as well as entertainment and information services that require multiple channels and greater bandwidth capabilities per channel. One preferred transmission medium for high bandwidth transmissions is optical fiber cables. Optical fiber cables are widely used for long distance transmission such as between two cities as well as extremely short range applications including data communications between functional blocks in a semiconductor circuit. However, optical fiber cables are less commonly used within buildings or homes.

A typical single optical fiber includes an inner glass core coated with a cladding material. The cladding material has a lower index of refraction than the core to promote total internal reflection of light propagating down the core. The cladding, in turn, is typically covered with one or more protective coatings. Often, two protective coatings including a primary layer and a secondary layer are utilized. Both primary and secondary layers are preferably UV-curable polymeric coatings.

The primary layer, or the layer that engages the cladding, is typically softer and more flexible than the secondary or outer layer which is harder for purposes of protecting the optical fiber during use. The primary and secondary coatings may be combined into a single coating, which are often referred to as buffer coatings.

A typical single mode optical fiber has a 9 $\mu$m diameter glass core and an outer cladding having a diameter of about 125 $\mu$m. Multiple mode fibers have a larger diameter core, ranging from 50 to 100 $\mu$m while the outer cladding diameter for multiple mode fibers ranges from 125 to 140 $\mu$m. The coatings for such optical fibers are typically available in two sizes, 250 $\mu$m and 900 $\mu$m.

When optical fiber cables are employed in structures such as buildings or homes in the form of short length cables or in local area networks, the optical fibers are usually bundled in multiple fiber packages referred to as premises cables. When such premises cables are used within a structure, modem building codes require that the premises cables meet specific flame-retardant guidelines.

To satisfy the flame-retardant guidelines, a number of strategies have been employed. One strategy is to add an additional flame-retardant layer on top of the single buffer layer or the primary and secondary coating layers. Such a strategy may not satisfy the guidelines if the buffer, primary and/or secondary layers are not flame-retardant. Thus, manufacturers have sought a single coating applied directly to the cladding layer and that is flame-retardant. However, as noted above, in addition to being flame-retardant, such a single buffer coating would also have to be sufficiently flexible to avoid damage when the optical fiber cable is bent and sufficiently hard to protect the optical fiber cable during use. Further, to reduce manufacturing cost, the buffer layer should be UV-curable.

Current UV-curable and flame-retardant materials for buffer layers are acrylate-based. Acrylate-based materials have fast UV-curable properties. However, in order to make an acrylate coating or buffer layer flame-retardant, inorganic materials such as aluminum hydroxide or potassium hydroxide, in particulate form, are added to the acrylate formulation. Adding particulate materials to an uncured liquid precursor to the buffer layer creates specific problems. For example, the addition of particulate materials adversely affects the structural integrity of the cured film. Yet another problem associated with the addition of particulates to an uncured liquid is that the particulate matter can settle out of the formulation prior to distribution around an optical fiber and therefore the particulate matter can be unevenly distributed throughout the buffer layer resulting in inconsistent properties of the cured buffer layer. Furthermore, the flame-retardant properties of acrylate films containing aluminum hydroxide or potassium hydroxide are only marginal at the level that the aluminum or potassium hydroxide materials can be distributed into the buffer layer formulation. Still further, inorganic material such as aluminum or potassium hydroxide adsorb moisture readily thereby undesirably increasing the tackiness of the surface of the cured buffer coating.

Therefore, there is a need for an improved single or multiple layer buffer coating for optical fibers that provides the requisite flexibility, hardness and flame-retardant properties and that is also UV-curable.

SUMMARY OF THE DISCLOSURE

An improved buffer coating for optical fibers is disclosed which comprises a halogenated epoxy resin. The halogenated epoxy resin is UV-curable and flame-retardant.

In a refinement, the halogenated epoxy resin comprises a brominated epoxy resin.

In further refinements, the buffer coating can further comprise any one or more of the following materials: an elastomer modified epoxy resin to provide additional tensile strength and flexibility; a surfactant or slip agent to decrease adhesion of the material to the optical fiber thereby facilitating any stripping away of the buffer layer from the optical fiber that may be necessary and further to improve the flow characteristics of the uncured material; a bisphenol resin to improve the integrity of the cured buffer material; a monomeric viscosity modifier such as an epoxy reactive diluent to reduce the viscosity of the uncured buffer material for improved processing; one or more polyols to increase the cure rate and cross-linking of the buffer material; and a photo-initiator.

In a refinement, the halogenated epoxy resin is present in an amount ranging from about 10 to about 60 wt %. In another refinement, the elastomer modified epoxy resin is present in an amount ranging from about 5 to about 85 wt %. One example of an elastomer modified epoxy resin is a diepoxide functional polymer of bisphenol F epoxy resin modified glycol and butadiene-acrylonitrile rubber. Other elastomer modified epoxy resins are suitable and will be apparent to those skilled in the art.

In a further refinement, the epoxy reactive diluent is present in an amount ranging from about 5 to about 85 wt % and, preferably, but not necessarily, comprises an epoxidized glycol.

In yet another refinement, the polyol is present in an amount ranging from about 3 to about 75 wt %, is preferably, but not necessarily, an epoxidized polyol, an example of which is an epoxidized sorbitol.

A surfactant or slip agent can also be included in the form of a silicon material, such as an organosilicone material. The surfactant or slip agent in the form of an organosilicone can be present in an amount ranging from about 0.5 to about 3.0 wt %.

A photo-initiator, preferably in a relatively high concentration ranging from about 1 to about 15%, is also present to provide an improved cure rate.

An improved optical fiber is also disclosed which includes a core, covered by a cladding which, in turn, is covered by a flame-retardant UV-curable buffer layer as described above.

A method for manufacturing an optical fiber is also disclosed which comprises coating a core with a cladding, coating the cladding with a buffer layer as described above, and curing the buffer layer with UV light or radiation.

The buffer layers described herein may also be colored with pigments or dyes for aesthetic purposes.

DETAILED DESCRIPTION OF THE PRESENTLY PREFERRED EMBODIMENTS

As opposed to the acrylate or urethane-based buffer coatings currently available, a buffer coating is proposed which is based upon a halogenated epoxy. Halogenated epoxies have been used in flame-retardant materials previously, but have not been used as a coating for fiber optic cables due to slow cure rates and high brittleness. To solve this problem, applicants provide an improved UV-curable flame-retardant formulation based upon a halogenated epoxy resin with the requisite flexibility, hardness, cure rate and sufficient flame retardancy.

The buffer coating is provided in the form of a resin and mixture that is extrudable. A major component is a halogenated epoxy resin, present in an amount ranging from about 5 to about 95 wt %. The halogenated epoxy resin provides the requisite flame-retardant properties. One preferred halogenated epoxy resin is a brominated epoxy resin. One preferred brominated epoxy resin is D.E.R.560™ sold by Dow Plastics, a business group of the Dow Chemical Company.

To provide tensile strength and flexibility to the cured buffer material, an elastomer modified epoxy resin is preferably added. The elastomer modified epoxy resin can be provided in an amount ranging from about 5 to about 95 wt %. One preferred elastomer modified epoxy resin is a bisphenol F epoxy resin modified with liquid butadiene-acrylonitrile (CTBN) rubber. One preferred epoxidized neopentyl glycol modified with a CTBN elastomer is ERISYS® EMRF-1320, sold by Specialty Chemicals, Inc., 2930 Route 73, North Maple Shade, N.J.

To provide improved integrity to the cured buffer material, a low viscosity bisphenol, Novolac resins and the like may be added in an amount ranging from about 5 to about 75 wt %. One preferred bisphenol resin is a bisphenol A resin having a low viscosity and sold under the trademark EPALLOY® 7138 by Specialty Chemicals, Inc.

Also, a viscosity modifier such as a monomer may also be added which can be an aliphatic difunctional epoxy reactive diluent. One preferred aliphatic difunctional epoxy reactive diluent is an epoxidized neopentyl glycol such as neopentyl glycol diglycidyl ether. The viscosity modifier may be provided in an amount ranging from about 5 to about 85 wt % and one preferred viscosity modifier of the above-mentioned type is sold under the trademark ERISYS® GE-20 by Specialty Chemicals, Inc.

Further, to improve cross-linking and increase the cure rate, one or more polyols may be added. The polyol may be an epoxidized polyol. One preferred epoxidized polyol is an epoxidized sorbitol sold under the trademark ERISYS® GE-60 by Specialty Chemicals, Inc. which is a sorbitol glycidyl ether. The polyol can be added in an amount ranging from about 3 to about 75 wt %.

A slip agent may also be added to decrease the adhesion of the buffer material to the cladding which makes the buffer layer more easily stripped from the fiber and which further improves the flow rate characteristics of the uncured buffer layer during extrusion. One preferred slip agent is a silicone material. More specifically, an organosilicone material. Such an organosilicone slip agent or surfactant can be provided in an amount ranging from about 0.5 to about 3 wt %. One preferred organosilicone surfactant is sold under the trademark SILWET® L-7602 by Witco Organosilicone's Group of Crompton Corporation, Nebr.

Finally, a photo-initiator is required. A relatively high level of a photoinitiator ranging from about 1 to about 15 wt % is preferred to increase the cure rate of the buffer layer. One preferred photo-initiator is an aryl or triaryl sufonium hexafluoroantimony salt or phosphate salt. One embodiment of which is sold under the tradename UVI 6992 of Union Carbide.

One exemplary embodiment of the disclosed buffer formulation is provided in Table 1. Further, suggested ranges for the various components of Table 1 are also provided in Table 2.

TABLE 1

|  | wt. % |
|---|---|
| Brominated epoxy resin | 30 |
| Elastomer modified epoxy resin | 16 |
| Bisphenol A resin | 20 |
| Neopentyl glycol diglycidyl ether | 15 |
| Sorbitol polyglycidyl ether | 11 |
| Organosilicone surfactant/slip agent | 2 |
| Aryl sulfonium hexafluoroantimony salt | 6 |

TABLE 2

|  | wt. % |
|---|---|
| Halogenated epoxy resin | 5–95 |
| Elastomer modified epoxy resin | 5–85 |
| Low viscosity bisphenol novolac resins | 5–75 |
| Monomeric viscosity modifier | 5–85 |
| Polyol | 3–75 |
| Slip agent or surfactant | 0.5–3 |
| Photo-initiator | 1–15 |
| Pigments or dyes (optional) | 0–10 |

The guidelines set forth in Table 2, if followed, provide suitable flexibility, hardness and cure rates.

While only certain embodiments have been set forth, alternative embodiments and various modifications will be apparent from the above description to those skilled in the art. These and other alternatives are considered equivalents and within the spirit and scope of this disclosure.

What is claimed:

1. A unitary buffer coating for covering a cladding layer of an optical fiber or fibers, the buffer coating comprising:

a halogenated epoxy resin mixed with an elastomer modified epoxy resin, neither resin being in a particulate form.

2. The buffer coating of claim 1 wherein the halogenated epoxy resin is UV-curable.

3. The buffer coating of claim 1 wherein the halogenated epoxy resin is flame-retardant.

4. The buffer coating of claim 1 wherein the halogenated epoxy resin comprises a brominated epoxy resin.

5. The buffer coating of claim 1 further comprising a surfactant.

6. The buffer coating of claim 1 wherein the surfactant comprises an organosilicone.

7. The buffer coating of claim 1 further comprising at least one resin selected from the group consisting of bisphenol resins and novolac resins.

8. The buffer coating of claim 1 further comprising a pigment or a dye.

9. The buffer coating of claim 1 further comprising a monomeric viscosity modifier.

10. The buffer coating of claim 9 wherein the monomeric viscosity modifier comprises an epoxy reactive diluent.

11. The buffer coating of claim 1 further comprising a polyol.

12. The buffer coating of claim 11 wherein the polyol is an epoxidized polyol.

13. The buffer coating of claim 1 further comprising a slip agent.

14. The buffer coating of claim 13 wherein the slip agent comprises an organosilicone.

15. The buffer coating of claim 1 further comprising a photo-initiator.

16. The buffer coating of claim 1 wherein the halogenated epoxy resin is present in an amount ranging from about 5 to about 75 wt %.

17. The buffer coating of claim 16 wherein the halogenated epoxy resin is UV-curable.

18. The buffer coating of claim 17 wherein the halogenated epoxy resin is flame-retardant.

19. The buffer coating of claim 16 wherein the halogenated epoxy resin comprises a brominated epoxy resin.

20. The buffer coating of claim 16 further comprising an elastomer modified epoxy resin present in an amount ranging from about 5 to about 85 wt %.

21. The buffer coating of claim 16 further comprising an organosilicone.

22. The buffer coating of claim 16 further comprising at least one resin selected from the group consisting of bisphenol resins and novolac resins present in an amount ranging from about 5 to about 75 wt %.

23. The buffer coating of claim 22 further comprising a monomeric viscosity modifier comprising an epoxy reactive diluent present in an amount ranging from about 5 to about 85 wt %.

24. The buffer coating of claim 23 further comprising an epoxidized polyol present in an amount ranging from about 3 to about 75 wt %.

25. The buffer coating of claim 24 further comprising an organosilicone present in an amount ranging from about 0.5 to about 3.0 wt %.

26. The buffer coating of claim 25 further comprising a photo-initiator present in an amount ranging from about 1 to about 15 wt %.

27. A unitary buffer coating mixture for covering a cladding layer of an optical fiber or fibers, the buffer coating comprising:

a flame-retardant and UV-curable halogenated epoxy resin present in an amount ranging from about 5 to about 95 wt %, an elastomer modified epoxy resin present in an amount ranging from about 5 to about 85 wt %, neither epoxy resin being in a particulate form, at least one resin selected from the group consisting of bisphenol resins and novolac resins present in an amount ranging from about 5 to about 75 wt %, an epoxy reactive diluent present in an amount ranging from about 10 to about 40 wt %, an epoxidized polyol present in an amount ranging from about 3 to about 75 wt %, an organosilicone present in an amount ranging from about 0.5 to about 3.0 wt %, a photo-initiator present in an amount ranging from about 1 to about 15 wt %.

28. The buffer coating of claim 27 wherein the halogenated epoxy resin comprises a brominated epoxy resin.

29. The buffer coating of claim 27 wherein the epoxy reactive diluent comprises an epoxidized polyol.

30. The buffer coating of claim 27 wherein the epoxidized polyol comprises an epoxidized sorbitol.

31. The buffer coating of claim 27 further comprising a pigment or a dye.

32. An optical fiber comprising:

a core, the core being covered by a cladding, the cladding being covered by a single flame-retardant buffer layer, the single buffer layer comprising halogenated epoxy resin and an elastomer modified epoxy resin, neither epoxy resin being in a particulate form.

33. The optical fiber of claim 32 wherein the halogenated epoxy resin is present in the buffer layer in an amount ranging from about 5 to about 95 wt %.

34. The optical fiber of claim 33 wherein the halogenated epoxy resin comprises a brominated epoxy resin.

35. The optical fiber of claim 33 wherein the elastomer modified epoxy resin is present in an amount ranging from about 5 to about 85 wt %.

36. The optical fiber cable of claim 35 wherein the buffer layer further comprises a resin selected from the group consisting of bisphenol and novolac resins present in an amount ranging from about 5 to about 75 wt %.

37. The optical fiber of claim 36 wherein the buffer layer further comprises a monomeric viscosity modifier comprising an epoxy reactive diluent present in an amount ranging from about 5 to about 85 wt %.

38. The optical fiber of claim 37 wherein the buffer layer further comprises an epoxidized polyol present in an amount ranging from about 3 to about 75 wt %.

39. The optical fiber cable of claim 38 wherein the buffer layer further comprises an organosilicone present in an amount ranging from about 0.5 to about 3.0 wt %.

40. The optical fiber of claim 37 wherein the buffer layer comprises an elastomer modified epoxy present in an amount ranging from about 5 to about 85 wt %.

41. The optical fiber cable of claim 33 wherein the buffer layer further comprises an organosilicone.

42. The optical fiber of claim 32 wherein the buffer lay further comprises a pigment or a dye.

43. A method of manufacturing an optical fiber, the method comprising:

coating a core with a cladding;

coating the cladding with a single buffer layer comprising a halogenated epoxy resin mixed with an elastomer modified epoxy, neither epoxy resin being in a particulate form;

curing the buffer layer with UV light.

44. The method of claim 43 wherein the halogenated epoxy resin is a brominated epoxy resin present in the buffer layer an amount ranging from about 5 to about 95 wt %.

45. The method of claim 44 wherein the buffer layer further comprises an elastomer modified epoxy resin present in an amount ranging from about 5 to about 85 wt %.

46. The method of claim 45 wherein the buffer layer further comprises a monomeric viscosity modifier comprising an epoxy reactive diluent present in an amount ranging from about 5 to about 85 wt %.

47. The method of claim 46 further comprising an organosilicone present in an amount ranging from about 0.5 to about 3.0 wt %.

48. The method of claim 44 wherein the buffer layer further comprises at least one resin selected from the group consisting of bisphenol resins and novolac resins present in an amount ranging from about 5 to about 75 wt %.

49. The method of claim 48 wherein the buffer layer further comprises an epoxidized polyol or a polyol present in an amount ranging from about 3 to about 15 wt %.

50. The method of claim 49 further comprising a photoinitiator present in an amount ranging from about 1 to about 15 wt %.

51. The method of claim 45 wherein the buffer layer further comprises a pigment or a dye.

* * * * *